United States Patent [19]

Rourke

[11] 4,210,632

[45] * Jul. 1, 1980

[54] PROCESS AND APPARATUS FOR CALCINING LIMESTONE

[75] Inventor: Terence A. Rourke, Nelson, Canada

[73] Assignee: Domlim Inc., Longueuil, Canada

[*] Notice: The portion of the term of this patent subsequent to Jun. 21, 1994, has been disclaimed.

[21] Appl. No.: 901,638

[22] Filed: May 1, 1978

[51] Int. Cl.² .................... C01F 11/06; F27D 1/08
[52] U.S. Cl. ................... 423/637; 422/232; 423/175; 432/25; 432/97
[58] Field of Search ............... 432/25, 58, 102, 97, 432/99; 23/277 R; 423/175, 177, 637

[56] References Cited

U.S. PATENT DOCUMENTS

| | | | |
|---|---|---|---|
| 1,243,311 | 10/1917 | Loder | 432/96 |
| 2,165,735 | 7/1939 | Tayler | 423/177 |
| 3,074,706 | 1/1963 | Schmid et al. | 432/99 |
| 3,584,849 | 6/1971 | Cremer et al. | 432/25 |
| 3,645,514 | 2/1972 | Lado | 432/17 |
| 3,887,326 | 6/1975 | Townley | 432/51 |
| 4,031,183 | 6/1977 | Rourke | 423/175 |

FOREIGN PATENT DOCUMENTS 165191 7/1976 Belgium.

Primary Examiner—Wayne A. Langel
Attorney, Agent, or Firm—Richard J. Hicks; Stanley E. Johnson

[57] ABSTRACT

A method and apparatus for calcining limestone in which limestone is burned continuously in a vertical kiln provided with at least one fuel injector which permits pulsed introduction of fuel thereto. Combustion air is passed continuously through the kiln and air/fuel mixing efficiency is enhanced by the use of an arch or hood superposed above the fuel injectors to thereby create a protected space in the mass of charged limestone.

15 Claims, 6 Drawing Figures

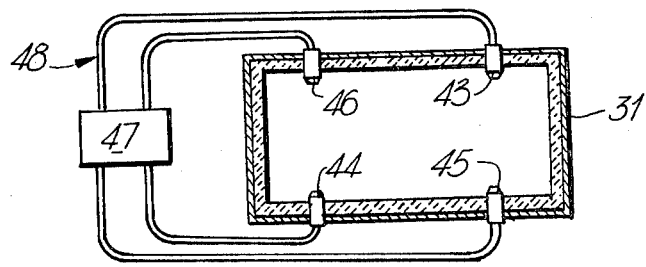
Fig-2-
(PRIOR ART)
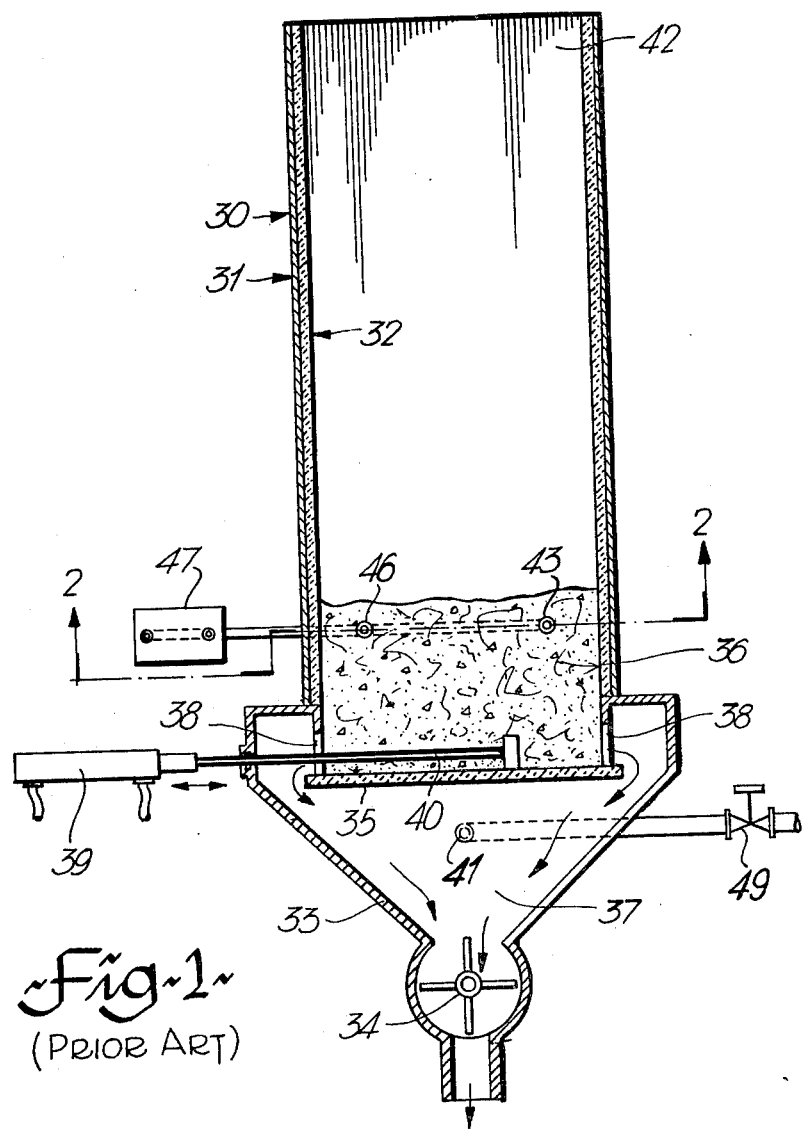
Fig-1-
(PRIOR ART)

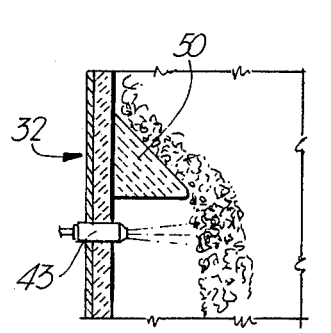
Fig-3-
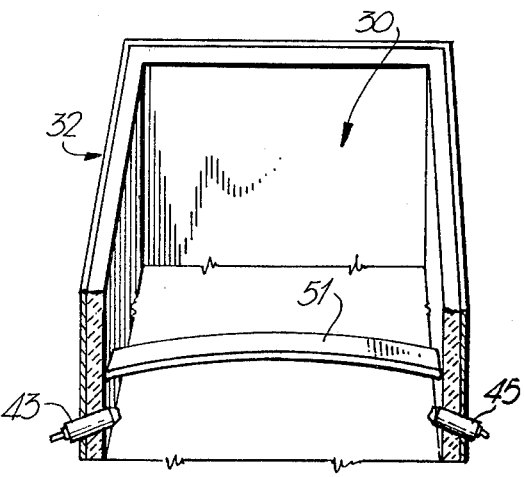
Fig-4-
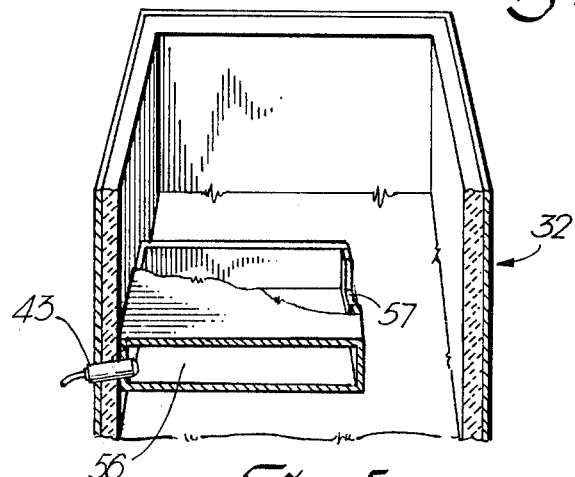
Fig-5-
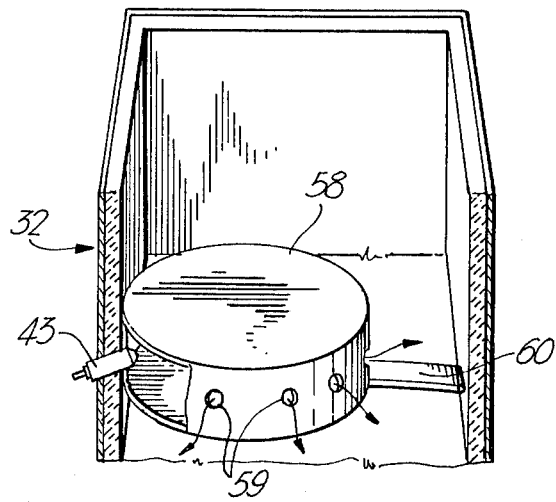
Fig-6-

PROCESS AND APPARATUS FOR CALCINING LIMESTONE

This application relates to a vertical shaft kiln or furance for calcining limestone and the like.

This application is related to my earlier filed U.S. application Ser. No. 559,193 filed Mar. 17, 1975 and now abandoned, C.I.P. application Ser. No. 658,576 filed Feb. 17, 1976 now U.S. Pat. No. 4,031,183 issued June 21, 1977 and divisional application Ser. No. 706,112 filed Jan. 17, 1977, the disclosures of which are incorporated herein by reference.

In the aforesaid applications there is described a process and apparatus for the continuous production of calcined lime from limestone in a vertical kiln in which fuel is supplied intermittently through a plurality of injectors circumferentially spaced around the kiln in a single horizontal plane spaced from the lower end of the kiln and combustion air is supplied continuously to the kiln, countercurrent to the downward flow of limestone, from a level below the fuel injectors. The fuel is injected at a pressure in the range between 2,000 and 15,000 psi through each of the injectors in a predetermined sequence at a pulse rate of between 100 and 500 injections per injector per minute, each of the injections occurring in a time period between 0.02 and 0.2 seconds. The fuel injection system is preferably based on the pump and fuel injector system of a conventional diesel engine and in a kiln designed to produce 5 tons/day of calcined lime, i.e. having a shaft height of about 8 feet and a cross sectional area of 2 square feet, substantially complete fuel combustion can be achieved at a fuel efficiency (theoretical fuel requirement divided by actual fuel used) which approaches 100%, under the aforesaid conditions. It was believed that the pulsing effect, at relatively high pressure, was essential to achieve the high fuel efficiencies which were in fact achieved. On this basis, therefore when scaling up the kiln to a shaft height of the order of 16 feet and a cross section of the order of 3 feet by 6 feet, it would appear that the pressures required to achieve the so-called "lamellar flow" i.e. alternate layers of air, fuel and air-fuel mixtures in the combustion zone, would be the same or greater than the heretofore employed 2,000 to 15,000 psi range. Surprisingly, however, it has now been found that substantially complete combustion and high efficiencies can be achieved at pressures as low as 100 psi, but preferably at about 1,000 psi, when a somewhat modified furnace, as described in more detail hereinafter, is employed. It is now believed that the high fuel efficiency of the operation is a function of a gasifying and partial mixing space adjacent the fuel injectors to bring the fuel as rapidly as possible up to the temperature of the surrounding area and the resulting rapid expansion of the fuel further aids the "lamellar flow" combustion process.

Also, as the pulse rate is adjusted to the size of stone being calcined, the production capacity of the kiln, the quality of stone being calcined, and the quality and reactivity of the lime being produced, it has been found that a pulse rate as high as a 1,000 injections per minute can sometimes be desirable. Although pressure may be one, in situ, way of achieving a mixing space, at least in relatively small diameter kilns, it is not believed to be critical per se.

Thus, it is an object of the present invention to provide an improved vertical kiln for the continuous production of calcined lime from limestone.

By one aspect of this invention there is provided a process for the continuous production of calcined lime in a vertical kiln in which fuel is injected, through at least one injector spaced from the lower end of the kiln, at a pulsed rate between 100 and 1,000 injections per injector per minute, with each of said injections occurring within a time period of up to one third of the pulse period, and air is passed continuously upwardly through the kiln countercurrent to the passage of lime therethrough and in an amount sufficient to support combustion, and wherein a protected space is provided in said kiln adjacent said injectors.

By another aspect of this invention there is provided an apparatus for the production of the clacined lime comprising:

a refractory lined vertical shaft provided with material feed means and gas exhaust means at the upper end thereof;

means to withdraw calcined lime from the lower end of said apparatus;

means for introducing air in an amount sufficient to support combustion in said apparatus to the lower end of said apparatus;

at least one injector means spaced from said lower end of said apparatus for introducing fuel into said shaft;

means for supplying fuel to said injector means at a rate between 100 and 1000 injections per minute; and deflector means vertically disposed above said injector means in said shaft, thereby creating a protected spaced adjacent said injectors.

The invention will be described hereinafter with reference to the drawings in which:

FIG. 1 is a cross sectional view of a kiln according to my earlier invention;

FIG. 2 is a plan view along line 2—2 of the kiln shown in FIG. 1;

FIG. 3 is an enlarged cross sectional view of the fuel injector portion of the kiln of FIG. 1 incorporating an embodiment of the present invention;

FIG. 4 is an enlarged cross sectional view, similar to FIG. 3, showing an alternative form of the present invention;

FIG. 5 is a sketch similar to FIGS. 3 and 4 of a further embodiment of the present invention; and FIG. 6 is a sketch of yet another embodiment of the present invention.

In FIGS. 1 and 2 there is illustrated a preferred form of kiln according to my prior invention, as described in detail in my U.S. Pat. No. 4,031,183 issued June 21, 1977. Briefly this kiln comprises a vertical shaft, shown generally at 30, having a rectangular cross section, as shown in FIG. 2. The shaft 30 is provided with a steel shell 31 lined with basic refractory brick 32, such as "MAGNECON" ®. The shaft is supported in the vertical position by any convenient and conventional means (not shown) and is connected to a sheet steel tapered base member 33, which is provided with an airlock 34 through which burned lime may be discharged. A mild steel draw feeder plate 35 of slightly larger dimensions to those of the shaft is supported in a horizontal plane within the tapered base 33 and somewhat below the bottom of shaft 30, so as to provide a baffle for burned material 36 falling into the base cooling hopper 37, through peripheral space or gap 38. A hydrualic draw cylinder 39 powers a ram 40 which reciprocates across the surface of plate 35 to draw burned material over alternate peripheral edges of plate 35 and down into hopper 37 through gap 38. Limestone generally in the size range of 5/16"-⅜", ⅜"-1¼", 1¼"-2½", 2½"-5" with a size ratio 1:2 is fed to the top 42 of the shaft 30, via a conventional kiln charging mechanism (not shown), to form a permeable column supported by feeder plate 35. It will be appreciated that although limestone up to about 2½" is normally employed, material up to about 5" may also be treated, depending on kiln size and specific operating techniques. Combustion air is introduced through a valve 49 and inlet 41 in hopper 37 from an external air compressor (not shown), so as to give a positive pressure in the cooling hopper 37 of approximately 4½" $H_2O$. The combustion air passes upwardly through openings 38 and is preheated by the descending burned lime which is in turn cooled so that it is discharged from airlock 34 at approximately 100°-200° F. Air is introduced in sufficient quantity to support combustion and for maximum efficiency the oxygen content of the exhaust gases should be substantially zero. In any event it is preferred that the oxygen content should be less than about 5%, so that the amount of air required may be simply monitored by analysis of the exhaust gases.

It will be appreciated that many modifications to this basic structure are possible and that certain elements therein are not essential. For example the draw feeder plate 35 is not essential and many other ways of withdrawing the calcined product may be employed. Also air flow through the kiln may be achieved by means of exhaust fans at the top of the kiln to draw air through the kiln.

Fuel oil is injected under a pressure of the order of 2,000 to 15,000 psi and preferably 6,000 to 8,000 psi into the charged stone column through conventional fuel injectors 43, 44, 45 and 46, in a pulsed sequence, is moved upwardly and then admixed with the continuously upwardly flowing preheated air. It then ignites and burns with a long flame. For simplicity and convenience, it has been found that a fuel injection pump 47 and system 48 from a conventional diesel engine is ideal. In such a diesel engine pump it has been found that operating at a speed of about 100 to 1,000 rpm the aforesaid "lamellar" flow of fuel and air through the shaft can be achieved. In the kiln shown in FIGS. 1 and 2, which is designed as a 5 ton/day kiln with a shaft cross-section of 1'×2' and a shaft height of 8', four fuel injectors 43, 44, 45 and 46 are shown and have been found satisfactory to achieve lamellar flow.

Upon scaling up the aforesaid kiln to a shaft height of about 16 feet, with a hearth 3'×6' and with a throughput of 60 tons of lime per day the aim is still to achieve complete combustion of the fuel at the top of the calcining zone, as measured by gas analysis at the gas exhaust. Because the weight of charged limestone is greater and the gas must penetrate a greater distance from the injection nozzle, it would appear to follow that the fuel pressure required is also greater. The increase in pressure can be avoided, however, and indeed the fuel pressure lowered to as low as 100 psi if the kiln is modified as shown in FIGS. 3-6.

In FIG. 3, there is shown a section of the kiln wall 32, immediately adjacent any one of nozzles 43-46, with a small brick or metal hood 50, preferably but not essentially triangular in shape. Hood 50 serves to deflect the falling charge 36 of limestone from the immediate vicinity of the nozzle and, in effect, creates a protected space adjacent thereto. The size of the space is, of course, a function of the angle of repose of the limestone charge and of the dimensions of the hood. As will be appreciated by those skilled in the art, such a protected space can be provided in any of a considerable number of alternative ways, some of which are shown in FIGS. 4, 5 and 6.

In FIG. 4 there is shown a kiln 30 having opposed walls 32, an injector nozzle 43 and immediately adjacent thereto and spanning the kiln between walls 32 an arch or plate 51 which serves substantially the same function as hood 50 in FIG. 3 to deflect the limestone away from the injector nozzle and create a void space. The arch or plate 51 is conveniently fabricated from refractory brick such as MAGNECON ®, or it may be a hollow steel plate structure which may, optionally, be water cooled. The arch 51 is generally 3" to 12" wide and extends across the kiln and thus covers, taking the example of the kiln depicted in FIG. 2, injectors 43 and 45. Of course, a second bridge or arch is provided to superpose injectors 44 and 46.

In FIG. 5 there is shown one form of a gas box 56 which may be fabricated around an individual injector nozzle 43. Box 56 is generally fabricated in refractory brick or steel and, again, functions to provide an air protected space 57, substantially out of direct contact with the falling charge of limestone. It will be appreciated that with the use of a box 56, a plurality of injector nozzles may not be necessary as the fuel distribution across the kiln is considerably improved. A single injector nozzle is generally all that is required.

In order to still further improve fuel distribution, a further modification of the gas box is shown in FIG. 6. A gas box 58 is provided with a plurality of peripheral slots or ports 59 through which the fuel is dispersed substantially uniformly across the combustion zone. Generally only a single injector nozzle 43 is required in the gas box. As box 58 is relatively large and must withstand substantial abrasive and other forces it is normally supported on an arch 60 which spans the kiln in the manner of arch 51 of FIG. 4. As pointed out hereinabove, a principal object of the present invention is to achieve uniform fuel distribution to thereby achieve maximum efficiency of combustion. It has been found that the shortest possible injection period is the most efficient, and that the kiln capacity can be controlled by the volume of air and its related fuel requirement. In general, as the velocity increases the pulse rate of the fuel injection is also increased.

I claim:

1. A process for the continuous production of calcined lime in a vertical kiln, in which fuel is injected, through at least one injector spaced from the lower end of the kiln, at a pulsed rate between 100 and 1,000 injections per injector per minute, each of said injections occurring in a time period of up to one third of the pulse period, and air is passed continuously upwardly, countercurrent to the passage of lime, through the kiln from a position below said injector and in an amount sufficient to support combustion, and wherein a protected void space is provided in said kiln adjacent and vertically above said injectors so as to form a mixing space for said fuel and air.

2. A process as claimed in claim 1 wherein said fuel is a liquid fuel oil.

3. A process as claimed in claim 2 wherein said fuel oil is injected at a pressure in the range between about 100 to 2,000 psi.

4. A process as claimed in claim 1 wherein said fuel is injected at a pressure in the range between about 100 and 15,000 psi.

5. A process as claimed in claim 1 wherein said fuel is injected at a pressure in the range between about 2,000 and 15,000 psi.

6. An apparatus for the production of calcined lime comprising: a refractory lined vertical shaft provided with material feed means and gas exhaust means at the upper end thereof;
  means to withdraw calcined lime from the lower end of said apparatus;
  at least one injector means spaced from said lower end of said apparatus for introducing fuel into said shaft;
  means for supplying fuel to said injector means at a rate between 100 and 1,000 injections per minute;
  means for passing air, in an amount sufficient to support combustion in said apparatus, through said apparatus from a position below said injector means; and
  deflector means disposed vertically above and spaced from said injector means in said shaft, thereby creating a protected void space adjacent and above said injector means in which said air and fuel mix.

7. An apparatus as claimed in claim 6 wherein said means for supplying fuel comprises pump means to supply said fuel at a pressure in the range between 100 and 15,000 psi.

8. An apparatus as claimed in claim 7 wherein said means for supplying fuel comprises pump means to supply a liquid fuel at a pressure in the range between about 100 and 2,000 psi.

9. An apparatus as claimed in claim 7 wherein said means for supplying fuel comprises pump means to supply fuel at a pressure in the range between 2,000 and 15,000 psi.

10. An apparatus as claimed in claim 6 wherein said deflector means comprises arch means extending across said shaft and disposed vertically above said injector means.

11. An apparatus as claimed in claim 10 wherein said arch means is disposed vertically above a pair of mutually horizontally opposed injector means.

12. An apparatus as claimed in claim 6 wherein said deflector comprises box means at least partially surrounding said injector.

13. An apparatus as claimed in claim 12 wherein said box means is supported on arch means in said shaft.

14. An apparatus as claimed in claim 6 including a plurality of injector means spaced around said shaft in a horizontal plane.

15. An apparatus as claimed in claim 6 wherein said deflector means comprises hood means secured to said shaft vertically above each said injector means.

* * * * *